(12) United States Patent
Mack et al.

(10) Patent No.: US 7,409,589 B2
(45) Date of Patent: Aug. 5, 2008

(54) METHOD AND APPARATUS FOR REDUCING NUMBER OF CYCLES REQUIRED TO CHECKPOINT INSTRUCTIONS IN A MULTI-THREADED PROCESSOR

(75) Inventors: Michael James Mack, Round Rock, TX (US); Kenneth Lundy Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 11/140,648

(22) Filed: May 27, 2005

(65) Prior Publication Data

US 2006/0271820 A1 Nov. 30, 2006

(51) Int. Cl.
*G06F 11/00* (2006.01)
(52) U.S. Cl. ............................ 714/15; 714/10; 712/228
(58) Field of Classification Search .................. None
See application file for complete search history.

(56) References Cited

U.S. PATENT DOCUMENTS

| | | | |
|---|---|---|---|
| 4,493,035 A | 1/1985 | MacGregor et al. | |
| 5,367,705 A | 11/1994 | Sites et al. | |
| 5,418,916 A | 5/1995 | Hall et al. | |
| 5,467,473 A | 11/1995 | Kahle et al. | |
| 5,481,683 A | 1/1996 | Karim | |
| 5,505,826 A | 4/1996 | Haglin et al. | |
| 5,586,278 A | 12/1996 | Papworth et al. | |
| 5,659,721 A | 8/1997 | Shen et al. | |
| 5,692,121 A | 11/1997 | Bozso et al. | |
| 5,740,414 A | 4/1998 | Tovey et al. | |
| 5,745,672 A | 4/1998 | Stiffler | |
| 5,793,944 A * | 8/1998 | Luick ........................ 714/15 | |
| 5,826,070 A | 10/1998 | Olson et al. | |
| 5,875,326 A | 2/1999 | Cheong et al. | |
| 5,884,061 A | 3/1999 | Hesson et al. | |
| 5,961,636 A | 10/1999 | Brooks et al. | |
| 5,978,896 A | 11/1999 | Kahle et al. | |
| 6,044,475 A | 3/2000 | Chung et al. | |
| 6,058,491 A | 5/2000 | Bossen et al. | |
| 6,105,148 A | 8/2000 | Chung et al. | |
| 6,286,094 B1 | 9/2001 | Derrick et al. | |
| 6,308,189 B1 | 10/2001 | Nguyen | |
| 6,308,260 B1 | 10/2001 | Le et al. | |
| 6,311,261 B1 | 10/2001 | Chamdani et al. | |
| 6,363,475 B1 | 3/2002 | Dowling | |
| 6,374,347 B1 * | 4/2002 | Johnson ..................... 712/228 |
| 6,415,376 B1 | 7/2002 | Mohamed et al. | |
| 6,553,480 B1 | 4/2003 | Cheong et al. | |
| 6,581,155 B1 | 6/2003 | Lohman et al. | |
| 6,622,263 B1 | 9/2003 | Stiffler et al. | |

(Continued)

*Primary Examiner*—Marc Duncan
(74) *Attorney, Agent, or Firm*—Duke W. Yee; Diana L. Gerhardt; Lisa L. B. Yociss

(57) ABSTRACT

A method and apparatus are provided for reducing the number of cycles required to checkpoint instructions in a multi-threaded microprocessor that has dispatch group checkpointing. A determination is made in a first stage of a checkpoint pipeline whether checkpointing can occur for a group of instructions. The results of processing the group of instructions flow to a second stage of the checkpoint pipeline regardless of whether the group of instructions is ready to checkpoint. If the group of instructions is ready to checkpoint, the group of instructions is checkpointed in a third stage of the checkpoint pipeline.

20 Claims, 5 Drawing Sheets

U.S. PATENT DOCUMENTS

| | | |
|---|---|---|
| 6,643,769 B1 | 11/2003 | Huck et al. |
| 6,654,877 B1 | 11/2003 | Huck et al. |
| 6,738,926 B2 | 5/2004 | Mathiske et al. |
| 6,785,842 B2 | 8/2004 | Zumkehr et al. |
| 6,802,024 B2 | 10/2004 | Unice |
| 6,839,828 B2 | 1/2005 | Gschwind et al. |
| 6,907,518 B1 * | 6/2005 | Lohman et al. ............. 712/222 |
| 6,941,489 B2 * | 9/2005 | DeLano ....................... 714/10 |
| 6,968,476 B2 * | 11/2005 | Barowski et al. .............. 714/15 |
| 6,981,104 B2 | 12/2005 | Prabhu |
| 7,015,718 B2 | 3/2006 | Burky et al. |
| 7,023,383 B2 | 4/2006 | Stilp et al. |
| 7,093,106 B2 | 8/2006 | Ambekar et al. |
| 7,120,762 B2 | 10/2006 | Rajwar et al. |
| 7,194,603 B2 | 3/2007 | Burky et al. |
| 7,213,135 B2 | 5/2007 | Burky et al. |
| 7,243,262 B2 * | 7/2007 | Mukherjee et al. ............ 714/15 |
| 2002/0066016 A1 | 5/2002 | Riodan |
| 2003/0005265 A1 | 1/2003 | Barowski et al. |
| 2003/0037221 A1 | 2/2003 | Gschwind et al. |
| 2004/0010663 A1 | 1/2004 | Prabhu |
| 2004/0024994 A1 | 2/2004 | Kurihara et al. |
| 2004/0139440 A1 | 7/2004 | Browning et al. |
| 2005/0050307 A1 * | 3/2005 | Reinhardt et al. ............ 712/227 |
| 2005/0050386 A1 | 3/2005 | Reinhardt et al. |
| 2005/0120191 A1 * | 6/2005 | Akkary et al. ............... 712/217 |
| 2005/0120254 A1 | 6/2005 | Suzuoki et al. |
| 2005/0138328 A1 | 6/2005 | Moy et al. |
| 2006/0179346 A1 * | 8/2006 | Bishop et al. ................. 714/13 |
| 2006/0212688 A1 * | 9/2006 | Chaudhry et al. ............ 712/228 |
| 2007/0277056 A1 | 11/2007 | Varadarajan et al. |

\* cited by examiner

METHOD AND APPARATUS FOR REDUCING NUMBER OF CYCLES REQUIRED TO CHECKPOINT INSTRUCTIONS IN A MULTI-THREADED PROCESSOR

BACKGROUND OF THE INVENTION

1. Field of the Invention

The present invention relates to microprocessors in a data processing system. More specifically, the present invention is directed to a method and apparatus for reducing the number of cycles required to checkpoint instructions in a multi-threaded microprocessor.

2. Description of the Related Art

Most data processing systems use mechanisms for detecting (and perhaps diagnosing) errors, as well as provide for the possibility of recovering from an error. These two functions are usually distinct, requiring different hardware (and software) mechanisms.

In modern computer systems, an error can occur anytime from a variety of sources, e.g., alpha particles striking a memory cell. Usually, the data of the architected registers are saved in checkpoint registers after the instructions have passed the completion point. "Checkpointing" means the saving of the architected register data in checkpoint registers. In order to be able to checkpoint, an instruction must have finished being processed. This means that all data that is needed to execute that instruction has arrived at the appropriate execution units and has been processed. Status bits and data complete signals are used to indicate whether all necessary data has arrived and whether an instruction has completed being executed.

Checkpointing is performed by the recovery unit (RUnit). In the event that an error is detected, the recovery unit restores the architected register values from the checkpoint registers.

The RAS (Reliability, Availability, and Serviceability) concept, as implemented in hardware and software, is directed to preventing or recognizing system failures (Reliability), the ability to keep the system functioning in the event of failure (Availability), and the ability to fix the failure in a non-disruptive way (Serviceability). RAS may be addressed at various levels of system development: to diagnose design bugs during new product development, in manufacturing to identify bad parts during the system build, and to catch errors while the system is operating. RAS may also be directed to various types of failures, including system-level design oversights, logical errors, hard failures (hardware faults), or soft errors (data errors in memory or after data transfer due to external noise or circuit failure).

In some cases it is only necessary to recognize that an error has occurred. In others it is necessary to diagnose the error, that is, to specifically identify its source. Finally, in some cases it is desirable to remove or correct the error.

A commonly used method of error detection utilizes parity codes. In a one-bit parity code the number of binary "ones" (1s) in a data word are counted. The word has odd parity if the number of 1s is odd and even parity otherwise. When a word is written into memory, the parity bit is also written. The parity bit is read and checked when the word is read out. If the stored and checked parity bits do not match, an error is detected. A one-bit parity code can detect at most one bit of error in the data item. If there are two bits of error the one-bit parity code will not detect any error since the parity will match the data with two errors.

While a one-bit parity code can detect an error, it cannot detect which particular bit in a data item is in error. Error correcting codes (ECCs), on the other hand, not only detect, but allow correction of an error. Many large memory systems use single error correcting, double error detecting (SEC-DED) code that allows detection of up to two bits of error and correction of a single bit of error. An error may be detected and corrected in a number of ways, including system software or by circuitry that is integral to the particular component that generates the error.

In traditional commercial-design, EDFI (Error Detection and Fault Isolation) was achieved via special checking-logic that was integral to the data flow and control. Error detection refers to the percentage of errors that could reasonably be detected, perhaps by using the parity schemes as discussed above. The error detection capability of such systems was high (e.g., 75%-90% of hardware faults detected). Fault isolation refers to percentage of errors that could be traced to a particular component. The fault isolation of these conventional systems was also good (e.g., about 90% of the errors could be traced to a single component).

While valuable for preserving data integrity, EDFI schemes are not without their disadvantages. In conventional mainframe designs, all logical circuits were checked as the system was operating. In many cases, however, the checking-logic (e.g. parity code predictors) were as complex as the circuit components (e.g., adders or shifters) themselves. This results in larger processors with circuits driving longer wires with more fan out, and generally longer cycle times.

The above described strategy uses the same fundamental concepts as existing zSeries processors, where a Recovery Unit (RUnit) maintains an error correction code (ECC) hardened checkpointed copy of all architected registers which can be restored in case of an error, with processing resumed from the restored checkpoint. The basic RUnit concept is that working copies of registers are integrated with the execution pipelines, and are updated and available for use as soon as an instruction finishes executing, while a separate copy of all registers are held in an ECC hardened checkpoint array. Updates to the checkpoint array are delayed from the working registers to allow for error detection and reporting, where a reported error blocks all further checkpoint updates so that the checkpoint remains intact at a coherent instruction boundary. Register updates are accumulated in a write queue until ready for checkpointing and then drained from the write queue into the checkpoint array.

Instructions are dispatched in groups. In order for the entire group to be ready to checkpoint, all instructions in the group must have completed execution. Some instructions have fixed execution times, while others have variable execution times. Additionally, floating point instructions may complete out of order. To determine if instructions are ready to checkpoint, a compare is performed on the dispatch group's tag (Gtag) versus the next instruction to complete (NTC) instruction tag (Itag). In addition, data arrival at the recovery unit must be considered since the group cannot be checkpointed until all of its data has arrived.

The checkpointing of groups must keep pace with the dispataching of groups, otherwise the performance of the processor will be degraded. In order to minimize any backward pressure on the dispatch and execution pipelines and store queue release to the L2 cache, the checkpointing of groups needs to occur as quickly as possible once all necessary conditions are satisfied and reported to the recovery unit.

Thus, it would be advantageous to provide a method and apparatus for reducing the number of cycles required to checkpoint instructions in a multi-threaded microprocessor.

SUMMARY OF THE INVENTION

A method and apparatus are provided for reducing the number of cycles required to checkpoint instructions in a multi-threaded microprocessor that has dispatch group checkpointing. A determination is made in a first stage of a checkpoint pipeline whether checkpointing can occur for a group of instructions. The results of processing the group of instructions flow to a second stage of the checkpoint pipeline regardless of whether the group of instructions is ready to checkpoint. If the group of instructions is ready to checkpoint, the group of instructions is checkpointed in a third stage of the checkpoint pipeline.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
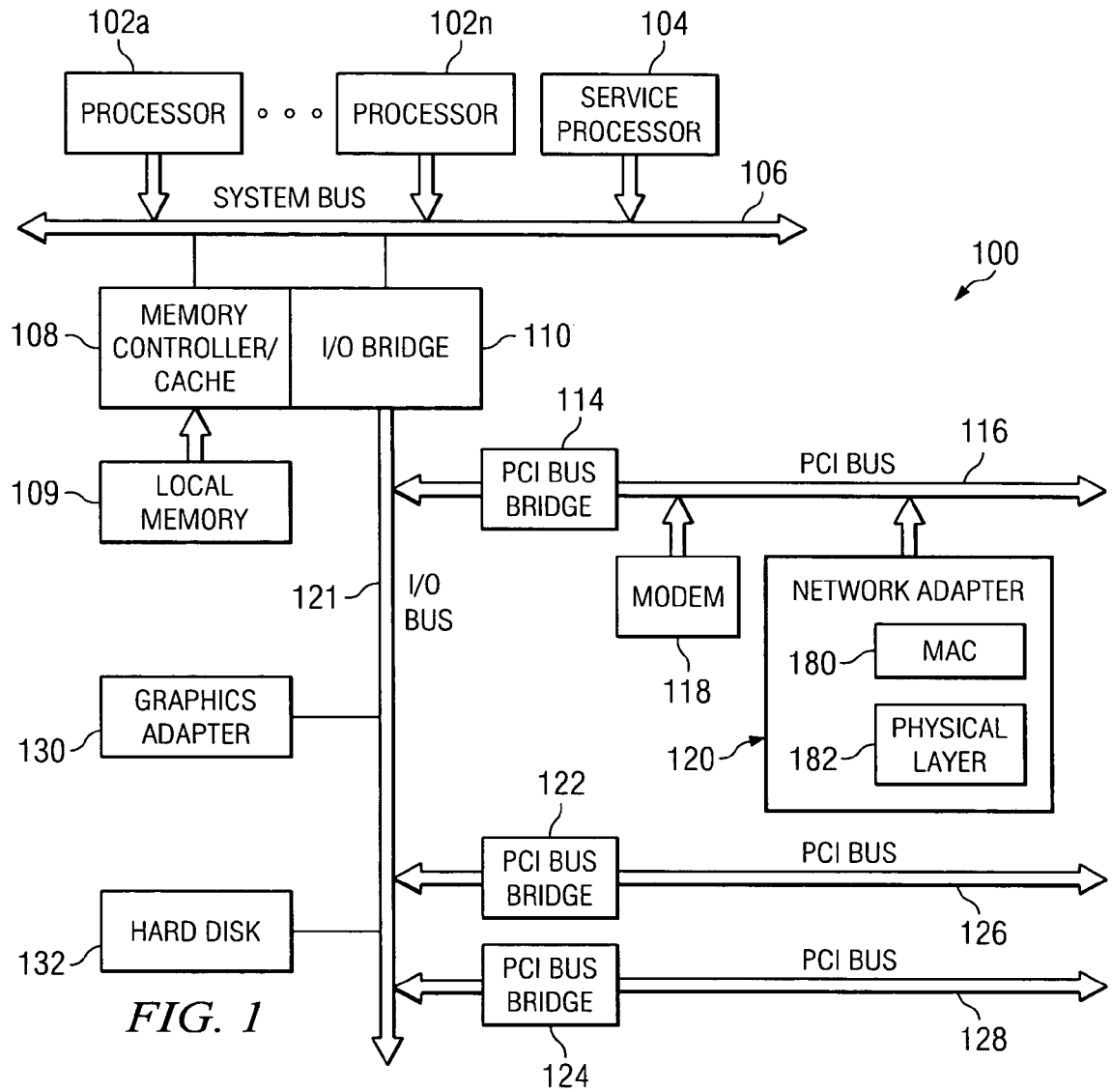
FIG. 1 depicts a block diagram of a data processing system that may be implemented in accordance with a preferred embodiment of the present invention.

The present invention provides a method and apparatus for reducing the number of cycles required to checkpoint instructions in a multi-threaded microprocessor.

The decision as to whether or not the instructions are ready to checkpoint is made by comparing the Gtag to the NTC Itag. At the time of dispatch, a group tag (Gtag) is sent along with the instructions to denote the age of the group relative to each instruction tag (Itag), and will be used to determine when a group can be checkpointed. A group can be checkpointed when the next-to-complete Itag (NTC Itag) is equal to or greater than the Gtag. When a group is partially flushed due to branch misprediction, load/store reject, or exception causing instruction, a new Gtag must be recalculated and saved by the recovery unit. This information is used to allow the recovery unit to partially checkpoint the original dispatch group while discarding data of the flushed instructions.

In a pipelined microprocessor with a low number of gate delays per stage of the checkpoint pipeline, the compare of the Gtag versus the NTC Itag must be used to manage the data queues that hold the result data. The result of the comparison is fed to the circuits that control the read and write pointers as well as other control circuits that are distributed throughout the recovery unit. The read pointers of the write queues and reorder buffer are advanced or held based on the result of the comparison.

When instructions are ready to checkpoint, entries in the write queues are deallocated, stores to the L2 cache are released, completion table entries are released, and interlocked floating point instructions are released.

Some instructions modify system coherent resources prior to being finished. The store conditional (STCX) instruction conditionally sets a lock, but the instruction cannot finish, or hence checkpoint, until the condition code is returned which indicates whether the lock was set or not.

Some cache-inhibited (CI) load instructions automatically increment queue pointers in I/O devices, but cannot finish, or hence checkpoint, until the load data is returned and written to the target register. Normally a reported error blocks the checkpoint, working copies of registers are restored from the checkpointed copies, and processing resumes from the prior checkpoint. However, since these STCX/CI-Load type instructions modify system coherent state prior to finishing/checkpointing, they may not be retried after an error if already started prior to the error.

In order to reduce the cost of tracking speculative instruction results, the present invention tracks instructions by dispatch group, i.e. instructions may be dispatched in program order to multiple execution units in any given processor cycle, and all instructions dispatched in the same cycle will be tracked and checkpointed together. Thus, the fixed point instructions and FPU or VMX instructions of the same dispatch group will be checkpointed together. An instruction group can only be checkpointed when all instructions in that group have passed the completion point. The processor can partially checkpoint each dispatch group since instructions in the dispatch group such as branch instructions, load/store instructions, or other exception causing instructions can cause the group to be partially flushed out, due to speculative execution. The cost of managing the instruction checkpoint by dispatch group is low compared with tracking each instruction individually.

Since fixed point instructions and FPU or VMX instructions are executed out-of-order with respect to each other, with the FPU and VMX instructions taking longer to execute than the fixed point instructions, the fixed point instructions will finish before the FPU or VMX instructions. Thus the fixed point data must wait at the recovery unit for the FPU or VMX instructions in the same dispatched group to be completed before the whole dispatch group can be checkpointed. The FPU and VMX instruction results are kept in separate queues from the fixed point instruction results. At dispatch time, the number of FPU instructions results expected from the dispatch group, and whether or not VMX instruction results are expected, is sent along with the dispatching instructions to the checkpoint queues in the recovery unit. The group can only be checkpointed when all FPU or VMX data for that group is available. If a dispatch group is partially flushed, and if any of the younger FPU or all of the VMX instructions in the group is also flushed out, then the number of FPU instructions in the group is recalculated along with the new Gtag. The new number of FPU instructions is also kept by the recovery unit to allow partially checkpoint of the dispatch group.

Note that the present invention describes a processor that is dual threaded, but the checkpointing of the registers for each thread is independent. The RUnit essentially separates the results for each thread into separate, duplicate resources.

Referring to FIG. 1, a block diagram of a data processing system that may be implemented as a server is depicted in accordance with a preferred embodiment of the present invention. Data processing system 100 may be a symmetric multiprocessor (SMP) system including a plurality of SMT-capable processors 102a-102n connected to system bus 106. Alternatively, a single processor system may be employed.

All of the processors described herein with reference to all of the figures are superscalar, SMT-capable processors. Each superscalar, SMT-capable processor is capable of concurrently executing multiple threads on the one processor with varied amount of resources allocated to each thread. Further, each thread will have assigned to it a hardware priority that the processor will use when determining what and how many of the superscalar resources and processing cycles to grant to a particular thread.

Also connected to system bus 106 is memory controller/cache 108, which provides an interface to local memory 109. I/O bus bridge 110 is connected to system bus 106 and provides an interface to I/O bus 121. Memory controller/cache 108 and I/O bus bridge 110 may be integrated as depicted.

Peripheral component interconnect (PCI) bus bridge 114 connected to I/O bus 121 provides an interface to PCI local bus 116. A number of modems may be connected to PCI local bus 116. Typical PCI bus implementations will support four PCI expansion slots or add-in connectors. Communications links to network computers may be provided through modem 118 and network adapter 120 connected to PCI local bus 116 through add-in connectors.

Network adapter 120 includes a physical layer 182 which conditions analog signals to go out to the network, such as for example an Ethernet network over an R45 connector. A media access controller (MAC) 180 is included within network adapter 120. MAC 180 is coupled to bus 116 and processes digital network signals.

MAC 180 serves as an interface between bus 116 and physical layer 182. MAC 180 performs a number of functions involved in the transmission and reception of data packets. For example, during the transmission of data, MAC 180 assembles the data to be transmitted into a packet with address and error detection fields. Conversely, during the reception of a packet, MAC 180 disassembles the packet and performs address checking and error detection. In addition, MAC 180 typically performs encoding/decoding of digital signals transmitted and performs preamble generation/removal as well as bit transmission/reception.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 121 as depicted, either directly or indirectly.

Service processor 104 interrogates system processors, memory components, and I/O bridges to generate an inventory and topology understanding of data processing system 100. Service processor 104 also executes built-in-self-tests (BISTs), basic assurance tests (BATs), and memory tests on all elements found by interrogating a system processor, memory controller, and I/O bridge. Any error information for failures detected during the BISTs, BATs, and memory tests are gathered and reported by Service Processor 104.

System Bus 106 can be connected to one or more like system busses which allows the data processing system to be incrementally scaled up to a large n-way SMP.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2A:
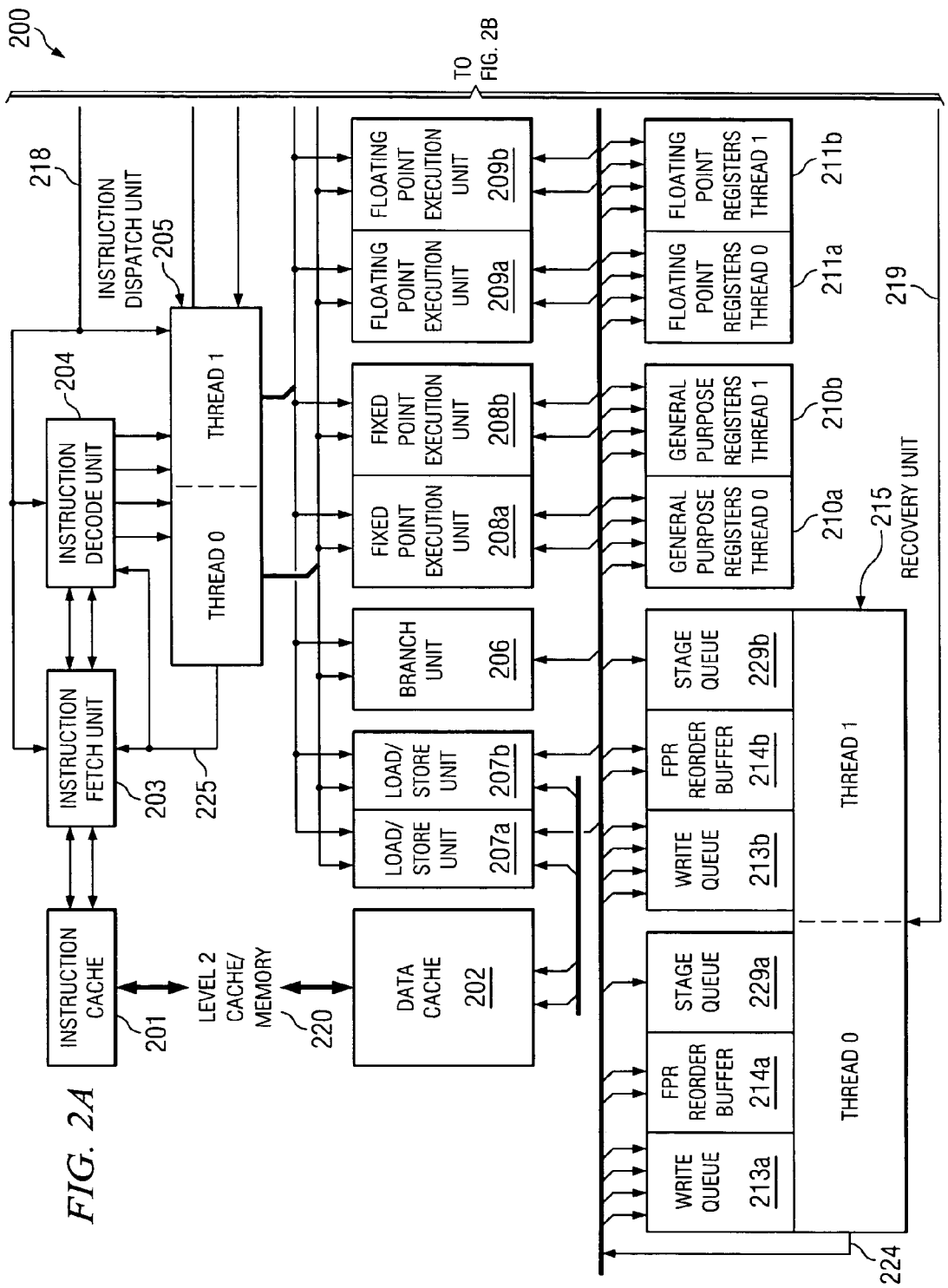
FIGS. 2A-2B depict an exemplary block diagram of a dual threaded processor design showing functional units and registers in accordance with the present invention.
Figure 2B:
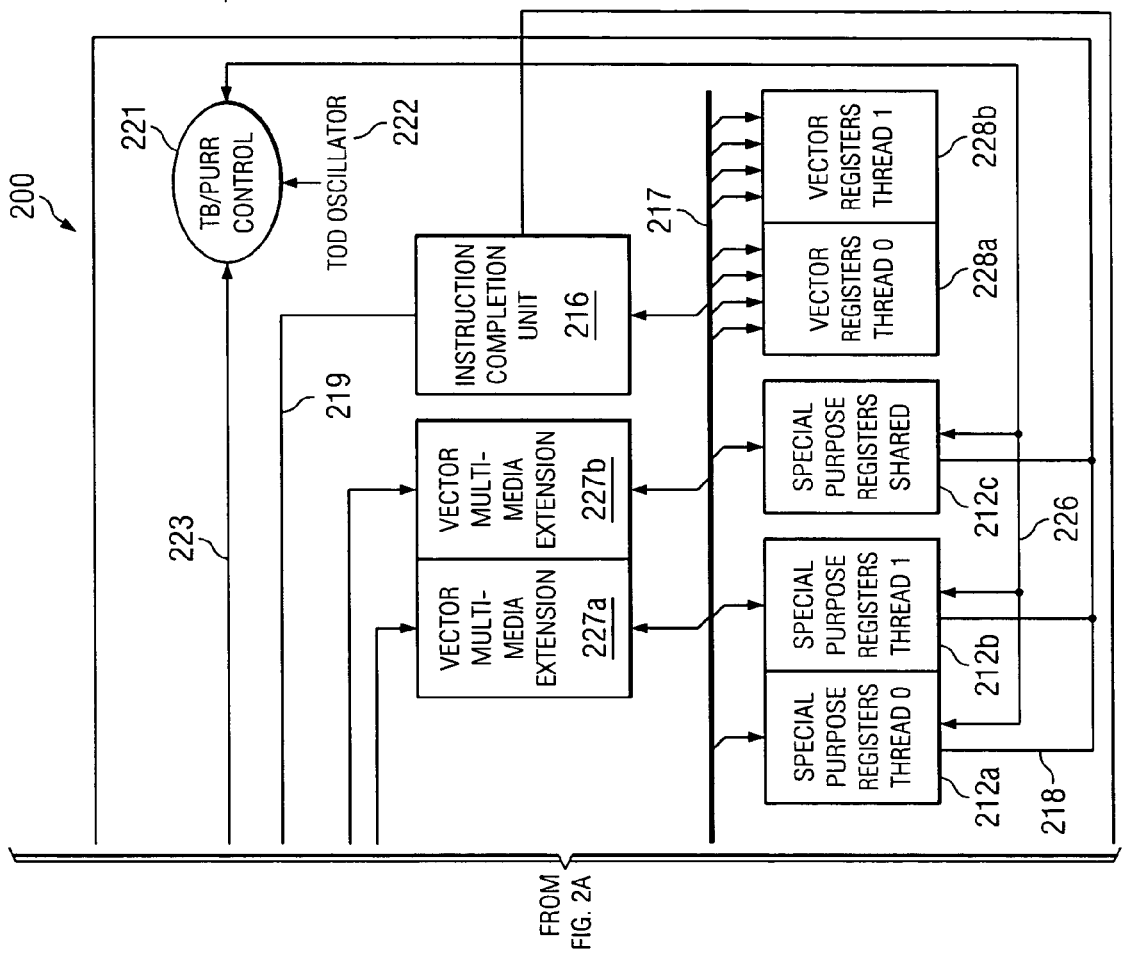

Referring to FIGS. 2A-2B, an exemplary block diagram of a dual threaded processor design showing functional units and registers in accordance with a preferred embodiment of the present invention is shown. The processor is generally designated by reference number 200, and may be implemented as one of processors 102a-102n in FIG. 1. Processor 200 comprises a single integrated circuit superscalar microprocessor with dual-thread SMT. Accordingly, as discussed further herein below, processor 200 includes various units, registers, buffers, memories, and other sections, all of which are formed by integrated circuitry.

As shown in FIGS. 2A-2B, instruction fetch unit (IFU) 203 is connected to instruction cache 201. Instruction cache 201 holds instructions for multiple programs (threads) to be executed. Instruction cache 201 also has an interface to level 2 (L2) cache/memory 220. IFU 203 requests instructions from instruction cache 201 according to an instruction address, and passes instructions to instruction decode unit 204. In a preferred embodiment of the present invention, IFU 203 can request multiple instructions from instruction cache 201 for up to two threads at the same time. Instruction decode unit 204 decodes multiple instructions for up to two threads at the same time and passes decoded instructions to instruction dispatch unit (IDU) 205. IDU 205 selectively groups decoded instructions from instruction decode unit 204 for each thread, and outputs a group of instructions for each thread to execution circuitry 206, 207a, 207b, 208a, 208b, 209a, 209b, 227a and 227b of the processor.

In a preferred embodiment of the present invention, the execution circuitry of the processor may include branch unit 206, fixed-point execution units (FXUA) 208a and (FXUB) 208b, load/store units (LSUA) 207a and (LSUB) 207b, floating-point execution units (FPUA) 209a and (FPUB) 209b, and vector multimedia extension units (VMXA) 227a and (VMXB) 227b. Execution units 206, 207a, 207b, 208a, 208b, 209a, 209b, 227a and 227b are fully shared across both threads.

The processor includes multiple register sets 210a, 210b, 211a, 211b, 212a, 212b, 212c, 228a, and 228b separately for each of the two threads, namely general purpose registers (GPR) 210a and 210b, floating-point registers (FPR) 211a and 211b, special purpose registers (SPR) 212a and 212b and vector register (VR) 228a and 228b. The processor additionally includes a set of SPRs 212c which is shared across both threads. Simplified internal bus structure 217 is shown to depict connections between execution units 206, 207a, 207b, 208a, 208b, 209a, 209b, 227a and 227b and register sets 210a, 210b, 211a, 211b, 212a, 212b, 212c, 228a, and 228b.

FPUA 209a and FPUB 209b input their register source operand information from and output their destination register operand data to FPRs 211a and 211b according to which thread each executing instruction belongs to. FXUA 208a, FXUB 208b, LSUA 207a, and LSUB 207b input their register source operand information from and output their destination register operand data to GPRs 210a and 210b according to which thread each executing instruction belongs to. A subset of instructions executed by FXUA 208a, FXUB 208b, and branch unit 206 use SPRs 212a, 212b and 212c as source and destination operand registers.

LSUA 207a and LSUB 207b input their storage operands from and output their storage operands to data cache 202 which stores operand data for multiple programs (threads). VMXA 227a and VMXB 227b input their register source operand information from and output their destination register operand data to VRs 228a and 228b according to which thread each executing instruction belongs to. Data cache 202 also has an interface to level 2 cache/memory 220.

Level 2 cache 220 may also have associated with it a non-cacheable unit (not shown) which accepts data from the processor and writes it directly to memory 220, thus bypassing the coherency protocols required for storage to cache.

In response to the instructions input from instruction cache 201 and decoded by instruction decode unit 204, IDU 205 selectively dispatches the instructions to execution units 206, 207a, 207b, 208a, 208b, 209a, and 209b, 227a and 227b. Execution units 206, 207a, 207b, 208a, 208b, 209a, 209b, 227a and 227b execute one or more instructions of a particular class of instructions. For example, FXUA 208a and FXUB 208b execute fixed-point mathematical operations on register source operands, such as addition, subtraction, ANDing, ORing and XORing. FPUA 209a and FPUB 209b execute floating-point mathematical operations on register source operands, such as floating-point multiplication and division.

LSUA 207a and LSUB 207b execute load and store instructions which move operand data between data cache 202 and registers 210a, 210b, 211a, and 211b. VMXA 227a and VMXB 227b execute single instruction operations that include multiple data. Branch unit 206 executes branch instructions which conditionally alter the flow of execution through a program by modifying the instruction address used by IFU 203 to request instructions from instruction cache 201.

IDU 205 groups together decoded instructions to be executed at the same time, depending on the mix of decoded instructions and available execution units 206, 207a, 207b, 208a, 208b, 209a, 209b, 227a and 227b to perform the required operation for each instruction. For example, because there are only two load/Store units 207a and 207b, a maximum of two load/store type instructions may be grouped together. In a preferred embodiment of the present invention, up to seven instructions may be grouped together (two fixed-point arithmetic, two load/store, two floating-point arithmetic or two vector multimedia extension, and one branch), and up to five instructions may belong to the same thread. IDU 205 includes in the group as many instructions as possible from the higher priority thread, up to five, before including instructions from the lower priority thread. However, either FPU instructions 209a and 209b or VMX instructions 227a and 227b are dispatched in the same group with fixed point instructions. FPU instructions 209a and 209b and VMX instructions 227a and 227b are never dispatched in the same group. Values in special purpose registers 212a and 212b indicate thread priority 218 to IDU 205.

Instruction completion unit 216 monitors internal bus structure 217 to determine when instructions executing in execution units 206, 207a, 207b, 208a, 208b, 209a, 209b, 227a and 227b are finished writing their operand results. Instructions executed by branch unit 206, FXUA 208a, FXUB 208b, LSUA 207a, and LSUB 207b require the same number of cycles to execute, while instructions executed by FPUA 209a, FPUB 209b, VMXA 227a and VMXB 228b require a variable, and a larger number of cycles to execute. Therefore, instructions that are grouped together and start executing at the same time do not necessarily finish executing at the same time. When all the instructions grouped together within a thread are finished writing their operand results, the group is said to be "completed."

Instruction completion unit 216 monitors for the completion of instruction, and sends control information 219 to IDU 205 to identify that more groups of instructions can be dispatched to execution units 206, 207a, 207b, 208a, 208b, 209a, 209b, 227a and 227b. IDU 205 sends control information 225 to IFU 203 and instruction decode unit 204 to indicate that it is ready to receive more decoded instructions.

Processor 200 preferable also includes error detection circuitry (not shown on FIGS. 2A-2B) throughout all functional units, and recovery unit 215 which contains a backup copy of registers 210a, 210b, 211a, 211b, 212a, 212b, 212c, 227a, and 227b for both threads. Results written to register sets 210a, 210b, 211a, 211b, 212a, 212b, 212c, 227a, and 227b are also written to queue structures 213a, 213b, 214a, 214b, 229a, and 229b over internal bus structure 217. Register results from branch unit 206, FXUA 208a, FXUB 208b, LSUA 207a, and LSUB 207b are held in write queue 213a and 213b according to which thread the associated instruction belongs to. Register results from VMXA 227a and VMXB 227b are held in stage queue 229a and 229b according to which thread the associated instruction belongs to. Write queue 213a and 213b for each thread is a simple first-in-first-out (FIFO) queue structure. Because instructions executed by FPUA 209a and FPUB 209b require a variable, and a larger number of cycles to execute, and may complete out-of-order, these results are written to FPR reorder buffer 214a and 214b according to which thread the associated instruction belongs to. FPR reorder buffer 214a and 214b arranges for each thread the results from FPUA 209a and FPUB 209b in the sequence which the associated instructions occurred in the program originally supplied by instruction cache 201.

The register results are held in write queue 213a and 213b, FPR reorder buffer 214a and 214b, and stage queue 229a and 229b for each thread until completion unit 216 indicates (via control 219) that all instructions in the group have completed for each thread. If no errors are reported by the error detection circuitry (not shown in FIGS. 2A-2B), the results are drained from queue structures 213a, 213b, 214a, 214b, 229a, and 229b into the backup copy of the associated registers in recovery unit 215. In the event of an error, recovery unit 215 discards the contents of write queue 213a and 213b, FPR reorder buffer 214a and 214b, and stage queue 229a and 229b for each thread, and restores the backup copy of register sets 210a, 210b, 211a, 211b, 212a, 212b, 212c, 228a, and 228b using internal bus structure 217. Processing may then be resumed from the known error-free instruction boundary. The process of copying, storing for a time and discarding such sets is known as checkpointing. There may be several such sets or backup copies stored in the recovery unit 215, and each set may be discarded on a FIFO basis, wherein each successive set represents the state of the registers after processing each group of instructions, wherein each set is known as a checkpoint.

Some of SPRs 212a, 212b, and 212c hold information used to control the operation of the various functional units. This is represented, simplified, in FIGS. 2A-2B by connection 218. SPRs 212a and 212b have separate copies for each thread, while 212c is shared across all threads. Not limited to these examples, SPRs 212a, 212b, and 212c may include instruction addresses, thread priority control, condition code, save/restore addresses, machine state, etc.

Scattered among the units and registers of the processor core 200, are a number of circuits known as pervasive cores. Such circuits are driven by a system clock that may be turned off or blocked to all simultaneously. The circuits draw little power and consequently generate little heat while no clocking is provided to them. The circuits include functions such as overriding the normal operation of their host units and placing their respective hosts into a recovery mode.

In a preferred embodiment of the present invention, the superscalar P6 processor has two fixed point execution pipelines (FXU), two load/store pipelines (LSU), two floating point execution pipelines (FPU), two vector multimedia extension pipelines (VMX) and one branch execution pipeline (BRU). The processor supports executing two independent instruction streams (threads) simultaneously. It can dispatch up to seven instructions each processor cycle, across both threads, with up to five instructions from the same thread. The FXU and LSU execution pipelines are the same depth, but are shorter than the FPU or VMX pipelines. Instructions that execute in the FXU and LSU execute in-order with respect to each other, but out-of-order with respect to instructions which execute in the FPU or VMX. Instructions which execute in the FPU execute out-of-order with respect to each other, and with respect to the FXU/LSU/BRU. VMX instructions take longer to execute than FXU/LSU/BRU instructions, and hence complete out-of-order with respect to them. Floating point loads are executed by the LSU, so both the LSU and FPU pipelines can update floating point registers (FPRs).

Working copies of registers are maintained in register files integrated within the execution pipelines, general purpose registers (GPRs) in the FXU, floating point registers (FPRs) in the FPU. These working copies are updated, and available for further use, as soon as an instruction finishes executing, while a separate checkpointed copy of all registers is maintained in an ECC protected checkpoint array (set of register files). Updates to the checkpoint array are delayed from the working registers to allow for error detection and reporting, where a reported error blocks all further checkpoint updates so that the checkpoint remains intact at a coherent instruction boundary.

The handling of branches is not significant to this invention, nor is the handling of the multiple threads. Although easily expandable across many independent threads, using separate, duplicate resources, this invention specifically applies to the managing of the checkpoint within a thread. There are also several dedicated interfaces for managing special purpose registers (SPRs), but unless explicitly noted, they are not significant to this invention.

Checkpoint management is primarily controlled by a Recovery Unit (RUnit). The RUnit contains queues to accumulate register results from the pipelines until they are ready to be checkpointed (write queues), and the register files that make up the checkpoint array. The checkpoint is maintained on an instruction group boundary.

Figure 3:
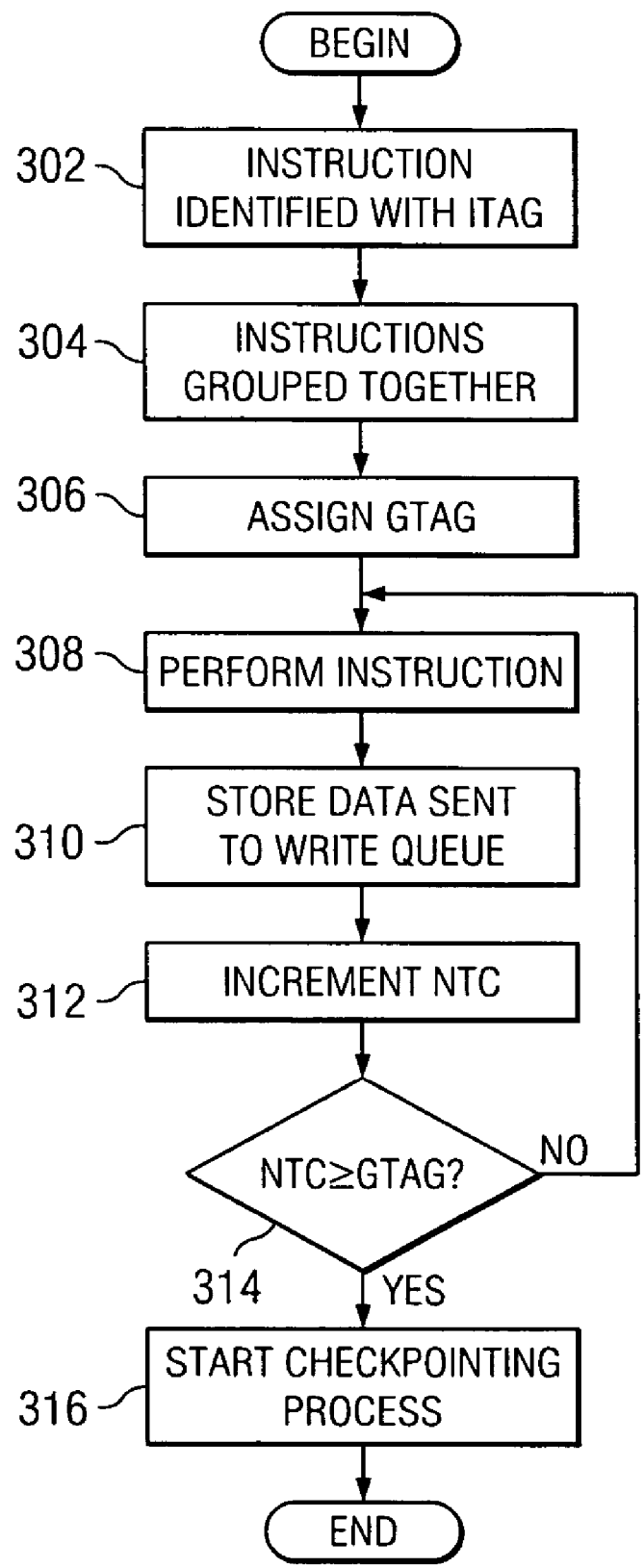
FIG. 3 illustrates a high level flowchart that depicts an exemplary operation of instruction implementation in accordance with the present invention.

Turning to FIG. 3, flowchart 300 illustrates an exemplary operation of instruction implementation in accordance with a preferred embodiment of the present invention. As the operation begins, each instruction is identified by an instruction tag (Itag) (block 302). Then the instructions are grouped together early in the pipeline and dispatched to the execution pipelines as a group (block 304). Itags are assigned sequentially so that the "oldest" instruction in a group has the smallest Itag. Each group of instructions is assigned a group tag (Gtag) for each thread, which is 1+ the Itag of the youngest instruction in the group, which means it is the same as the Itag of the oldest instruction of the next group (block 306). As the operation continues, the instructions are performed (block 308) and the results (store data) are sent to a write queue (block 310). Completion logic keeps track of which outstanding instructions have finished executing, and maintains a next-to-complete (NTC) Itag, which points to the instruction address of the oldest instruction which has not finished executing yet and is incremented with each instruction group (block 312). If the NTC is not greater than the Gtag, the operation returns to block 308 where the next instruction is performed. When the NTC Itag is greater than or equal to a Gtag, it indicates that all the instructions in the group have finished executing and results can be checkpointed (block 316) and this operation ends.

Because the FPU can execute instructions out-of-order with respect to the FXU, LSU and BRU, the RUnit has two separate write queues, one for FPU results called the floating point write queue (FPWQ), and one for FXU, LSU and BRU results called the fixed point write queue (FXWQ). The FXWQ for the FXU, LSU and BRU is a simple FIFO, but the FPWQ for the FPU is a re-order buffer which has slots assigned in order, but gets loaded corresponding to the order that the FPU executes instructions. Because VMX unit instructions complete in-order and are guaranteed to be the latest completing instructions in a group, when VMX instructions complete, the entire group will checkpoint (unless an exception condition is encountered.) Thus, the RUnit uses a staging register (queue of depth 1) for VMX results. The Gtag is included with the result busses to the RUnit for the FXU/LSU/BRU so the RUnit knows which instruction group the register updates are for. It is possible that multiple instruction groups could be finished, but waiting on a FPU operation from an older group to finish because it executed out of order. When the older instruction finally finishes, the NTC Itag may jump ahead multiple groups. This means that both the FXU/LSU and FPU write queues will then have instruction groups that are ready to drain into the checkpoint array.

Thus, as the FXU/LSU/BRU finish executing instructions, the FXU/LSU/BRU results along with finish valids, and the general purpose register (GPR)/condition code register (CR)/fixed point exception register (XER) target register addresses are sent to the RUnit. Only non-flushed instructions will generate finish valids. The finished instruction tags (ITag) and instruction finish valids are sent to the Completion Unit. At the RUnit, the FXU/LSU/BRU results, GPR/CR/XER address, and finish valids are written into the fixed point write queue (FXWQ). For each entry in the FXWQ, there is a corresponding GTAG and number of floating point instructions (#FPU) for that group. This entry will be held until it can be checkpointed and transferred its data to the Checkpoint GPR.

Additionally, as the FPU finishes executing instructions, the FPU results along with the FPR target register addresses are sent to the RUnit. Again, only non-flushed instructions will generate finish valids. The finished ITAG, instruction finish valids are sent to the completion unit. At the RUnit, the FPU results, FPR address, and finish valids are written into the floating point write queue (FPWQ); this entry will be held until it can be checkpointed and transferred its data to the checkpoint FPR.

Additionally, as the VMX unit finishes executing instructions, the VMX results along with the VMX target register addresses are sent to the RUnit. Again, only non-flushed instructions will generate finish valids. The finished ITAG, instruction finish valids are sent to the completion unit. At the RUnit, the VMX results, VMX address, and finish valids are written into the VMX staging register); this entry will be held until it can be checkpointed and transferred its data to the checkpoint vector register (VR).

Figure 4:
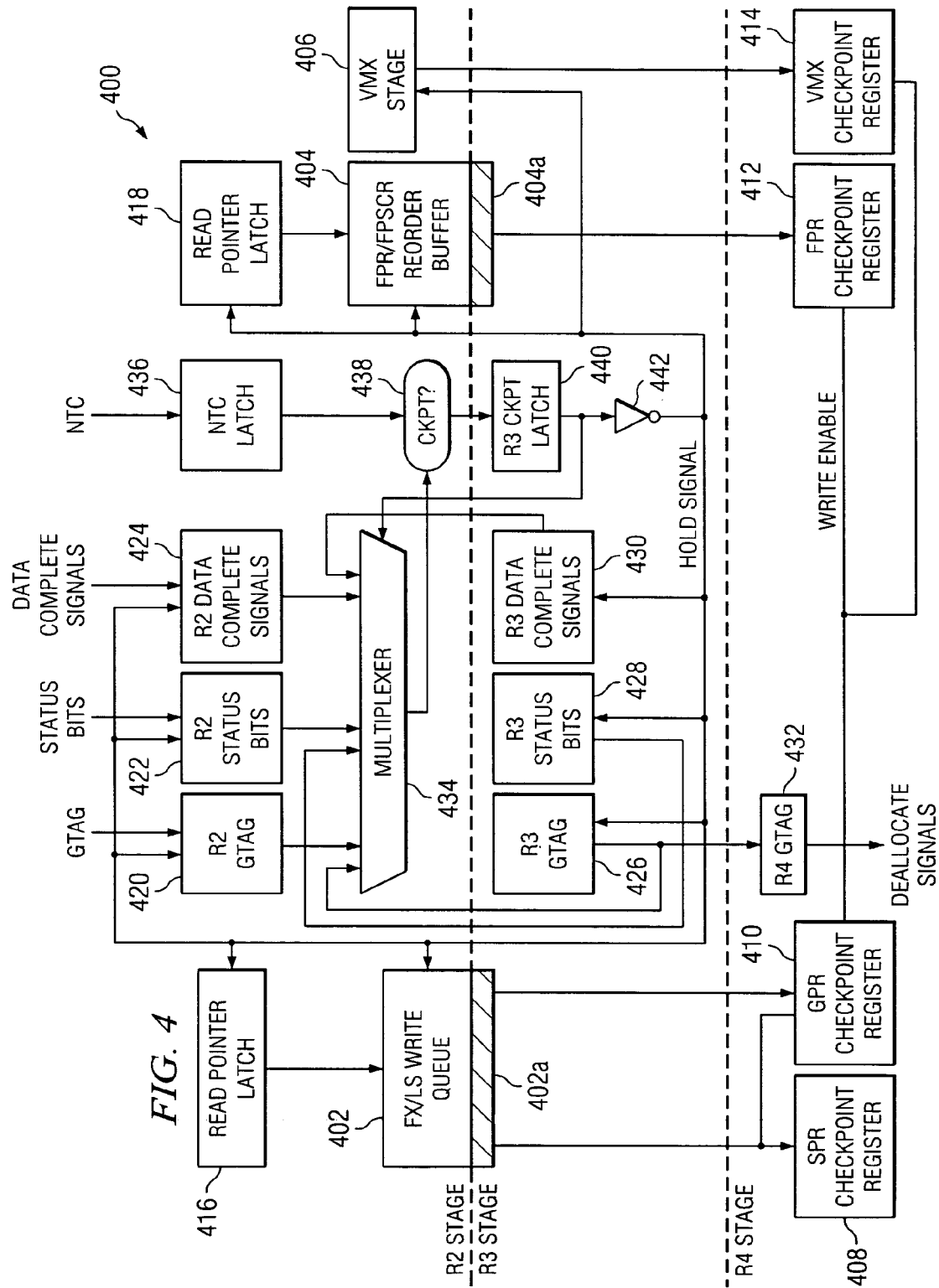
FIG. 4 is a block diagram of three checkpoint pipeline stages including a portion of a recovery unit in accordance with the present invention.

FIG. 4 is a block diagram of a portion 400 of a recovery unit in accordance with the present invention. Three checkpoint pipeline stages are depicted, R2, R3, and R4. The R2 stage occurs, in the pipeline, before the R3 stage which occurs before the R4 stage.

Portion 400 of RUnit includes a fixed point load/store (FX/LS) write queue 402, a floating point register/floating point status and control register (FPR/FRSCR) reorder buffer 404, a VMX stage 406, a special purpose register (SPR) checkpoint register file 408, a general purpose register (GPR) checkpoint register file 410, a floating point register (FPR) checkpoint register file 412, and a VMX checkpoint register file 414.

Portion 400 of the RUnit also includes a read pointer latch 416 that provides its output as an input into write queue 402 and a read pointer latch 418 that provides its output as an input into reorder buffer 404. Portion 400 of the RUnit includes latches 420, 422, 424, 426, 428, 430, and 432.

The GTag information is input into latch 420. Latch 420 holds the R2 value of the GTag. Latch 426 holds the R3 value of the GTag. Latch 432 holds the R4 value of the GTag.

The current values of status bits are input into latch 422. Latch 422 holds the R2 value of the status bits. Latch 428 holds the R3 value of the status bits.

The current values of data complete signals are input into latch 424. Latch 424 holds the R2 value of the data complete signals. Latch 430 holds the R3 value of the data complete signals.

The current value of the next to complete tag (NTC) is input into latch 436.

The value in the write queue 402 is written to SPR checkpoint register file 408 and GPR checkpoint register file 410 when the instructions in write queue 402 are ready to checkpoint.

The value in reorder buffer 404 is written to FPR checkpoint register file 412, and the FPSCR checkpoint register when the instructions in reorder buffer 404 are ready to checkpoint. The value in VMX stage 406 is written to VMX checkpoint register file 414 when the instructions in VMX stage 406 are ready to checkpoint.

Write queue 402, reorder buffer 404, and VMX stage 406 receive a signal when checkpointing of the instructions in these devices can occur. A hold signal is distributed from inverter 440 to read pointer latch 416, write queue 402, read pointer latch 418, reorder buffer 404, and VMX stage 406. This signal will indicate whether checkpointing can occur or checkpointing cannot occur in which case the data in these devices must be held.

The checkpoint signal will also be distributed from inverter 442 to latches 420, 422, 424, 426, 428, and 430 to indicate whether or not the GTAG, status, and instruction complete information for the following group of instructions needs to be held until the preceding group is successfully checkpointed.

A checkpoint decision is made by checkpoint logic 438. Checkpoint logic 438 receives the value of the NTC tag from latch 436 and receives the GTag, status bits, and data complete signals from either R2 latches 420, 422, and 424 or R3 latches 426, 428, and 430.

Multiplexer 434 is used to select either the values in R2 latches 420, 422, and 424 or R3 latches 426, 428, and 430. Multiplexer 434 is controlled by a select signal that is received from R3 checkpoint decision latch 440.

The first time through stage R2, checkpoint logic 438 will receive the values from R2 latches 420, 422, and 424 to use to determine whether checkpointing can occur. This decision is made in the R2 stage. When the decision in the R2 stage is made that checkpointing cannot occur, this result is latched into R3 latch 440 and is used as a control signal to select the values from R3 latches 426, 428, and 430 to use as inputs into checkpoint decision logic 438. Thus, checkpoint decision logic 438 will now use the R3 values of the GTag, status bits, and data complete signals when determining whether to checkpoint.

As depicted, the checkpoint decision is made in the R2 stage. The result of the checkpoint decision is latched in the R3 stage and distributed in the R3 stage to the devices that need the result of the decision.

All results and pointers in queues 402 and 404 are allowed to flow into the next stage of the checkpointing pipeline via registers 402a and 404a. If the result was successful and checkpointing can occur, the pipeline will advance to write the checkpoint for the current group to the checkpoint register files. However, if the result was unsuccessful and checkpointing cannot occur, the latched version of the result is used to hold all data and pointers in the R3 stage. The compare results are multiplexed, using multiplexer 434, back into the compare circuitry 438 until the checkpoint comparison is successful. In either case, each checkpoint decision will save one cycle of delay over simply latching the result.

Queues 402 and 404 each include a portion of the queue that is in the R3 stage. An output data register 402a, included in queue 402, is located in stage R3. An output data register 404a, included in queue 404, is located in stage R3.

A first portion of queues 402 and 404 is in the R2 stage. A second portion of queues 402 and 404 is in the R3 stage. Data and pointers addresses flow into each queue in the R2 stage. If checkpointing can occur, the data flows directly from the R2 stage into the checkpoint register files in the R4 stage passing through the R3 stage without needing to be latched in the R3 stage. If checkpointing cannot occur, the data flows into the R3 stage by flowing into section portions 402a and 404a. The data is then held in the R3 stage until checkpointing can occur.

Further, since each of the register files 402 and 404 used to hold data already includes an output data register, i.e. 402a and 404a, that is in the R3 stage to satisfy timing requirements, no additional circuit area is consumed for the data holding function. Minimal additional circuitry is required for the read pointer latches 416 and 418 and compare circuits.

The Gtag for each dispatch group, fixed point data, and floating point data are each held in independently managed queues 402 and 404. The VMX data is not queued since it is the latest arriving data and does not complete out of order. Gtags arrive at the compare circuitry 438 along with the NTC Itag in the R2 stage.

In the floating point queue 404, the read pointers advance when all of the data associated with the oldest Gtag has arrived, and the data in the register file 404 output data register 404a then advances to the R3 stage. During the R3 stage, the data will either be checkpointed or will remain until all conditions are satisfied. If any data results from younger dispatch groups arrive, it is written to the register file 404 and will remain until it becomes the head of the queue. Similarly, if the fixed point queue 402 required delayed data, i.e. data that takes more than the normal, fixed amount of cycles to generate, such as SPR transfers, the fixed point queue's read pointers will wait for that data. Otherwise, the fixed point data will advance to the R3 stage in output data register 402a as well. If the Gtag indicates that the VMX data is required, all other queues will advance to the R3 stage until the VMX data arrives in the recovery unit.

In the R2 stage of the checkpoint control circuitry, the NTC Itag versus the Gtag comparison is performed. All tags and status indications then advance to the R3 stage. In this R3 stage, if the result of the previous cycle's compare is unsuccessful, hold indications are driven to all read pointers in latches 416 and 418 and data hold registers in 402 and 404. The R3 stage tag and status controls are fed back and multiplexed with the R2 stage, which may now hold a successive transaction. When all data and tag conditions are satisfied, the result of the multiplexed compare circuits is latched in the R3 stage as a success, and all data proceeds to the checkpoint register files 108-414. The store queue, Global Completion Table (GCT) and floating point paths can then be released according to the checkpoint state.

Although the invention can take the form of an entirely hardware embodiment, an entirely software embodiment or an embodiment containing both hardware and software elements, in a preferred embodiment, the invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for reducing the number of cycles required to checkpoint instructions in a multi-threaded microprocessor that has dispatch group checkpointing, the method comprising:
   determining in a first stage of a checkpoint pipeline whether checkpointing can occur for a group of instructions;
   permitting results of processing said group of instructions to flow to a second stage of said checkpoint pipeline regardless of whether said group of instructions is ready to checkpoint; and
   in response to determining that said group of instructions is ready to checkpoint, checkpointing said group of instructions in a third stage of said checkpoint pipeline.

2. The method according to claim 1, further comprising:
   maintaining a result of execution of said group of instructions in a queue, a first portion of said queue being in said first stage and a second portion of said queue being in a second stage;
   initially storing said results of said processing in said queue in said first portion; and
   permitting said results to flow from said first portion in said first stage into said second portion in said second stage regardless of whether said group of instructions is ready to checkpoint.

3. The method according to claim 2, further comprising:
   latching a result of said checkpoint determination in said second stage; and
   distributing said latched result to said queue.

4. The method according to claim 2, further comprising:
   in response to determining that said group of instructions is not ready to checkpoint, holding said results in said second portion in said second stage until a determination is made that checkpointing can occur.

5. The method according to claim 2, further comprising:
   storing read pointers in a read latch included in said first stage; and
   utilizing said read pointer to select results from said queue.

6. The method according to claim 1, further comprising:
   receiving signals that indicate a completion status for said group of instructions;
   storing said signals in first latches in said first stage;
   in response to a determination that checkpointing cannot occur, storing said signals in second latches in said second stage; and
   selecting signals from said first latches to use to make said determination in said first stage of whether checkpointing can occur for said group of instructions.

7. The method according to claim 6, further comprising:
   in response to determining that checkpointing cannot occur, selecting signals from said second latches to use to make said determination.

8. The method according to claim 6, further comprising:
   latching a result of said checkpoint determination in said second stage;
   receiving said latched result in a multiplexer that is included in said first stage;
   selecting, using said multiplexer, either said signals from said first latches or said signals from said second latches;
   selecting said signals, utilizing said multiplexer, from said first latches to make a first determination of whether checkpointing can occur; and
   selecting said signals, utilizing said multiplexer, from said second latches in response to said latched result indicating, after said first determination, that said checkpointing cannot occur.

9. An apparatus in a data processing system for reducing the number of cycles required to checkpoint instructions in a multi-threaded microprocessor that has dispatch group checkpointing, said apparatus comprising:
   a checkpoint pipeline including a first stage, a second stage, and a third stage;
   checkpoint decision logic included in said first stage for determining in said first stage whether checkpointing can occur for a group of instructions;
   results of processing said group of instructions flowing to said second stage of said checkpoint pipeline regardless of whether said group of instructions is ready to checkpoint; and in response to determining that said group of instructions is ready to checkpoint, checkpoint register files in said third stage for checkpointing said group of instructions.

10. The apparatus according to claim 9, further comprising:
a queue for maintaining a result of execution of said group of instructions, said queue including a first portion in said first stage and a second portion in a second stage;
said first portion for initially storing said results of said processing; and
results of said processing flowing from said first portion into said second portion regardless of whether said group of instructions is ready to checkpoint.

11. The apparatus according to claim 10, further comprising:
a latch in said second stage for latching a result of said checkpoint determination; and
said latch for distributing said latched result to said queue.

12. The apparatus according to claim 10, further comprising:
in response to determining that said group of instructions is not ready to checkpoint, said second portion for holding said results in said second portion in said second stage until a determination is made that checkpointing can occur.

13. The apparatus according to claim 10, further comprising:
a read latch included in said first stage for storing read pointers; and
said read pointer utilized to select results from said queue.

14. The apparatus according to claim 13, further comprising:
said read latch receiving said latched result.

15. The apparatus according to claim 9, further comprising:
first latches for storing said signals in said first stage;
in response to a determination that checkpointing cannot occur, second latches for storing said signals in said second stage; and
a multiplexer for selecting signals from said first latches to use to make said determination in said first stage of whether checkpointing can occur for said group of instructions.

16. The apparatus according to claim 15, further comprising:
in response to determining that checkpointing cannot occur, said multiplexer selecting signals from said second latches.

17. The apparatus according to claim 16, further comprising:
said checkpoint decision logic receiving an output from said multiplexer; and
said multiplexer outputting either said signals from said first latches or said signals from said second latches.

18. The apparatus according to claim 16, further comprising:
said checkpoint decision logic receiving said signals from said second latches to use to make said determination.

19. The apparatus according to claim 16, further comprising:
a checkpoint latch included in said second stage for latching a result of said checkpoint determination;
said multiplexer receiving said latched result;
said multiplexer selecting either said signals from said first latches or said signals from said second latches;
said multiplexer selecting said signals from said first latches to make a first determination of whether checkpointing can occur; and
said multiplexer selecting said signals from said second latches in response to said latched result indicating, after said first determination, that said checkpointing cannot occur.

20. The apparatus according to claim 19, further comprising:
said checkpoint decision logic outputting said result of said checkpoint determination;
said latch receiving said output from checkpoint decision logic, said latch coupled to an inverter;
said inverter inverting said result of said checkpoint determination and generating an output, said output being a hold signal;
in response to determining that said group of instructions is not ready to checkpoint, said hold signal being distributed to a queue that maintains a result of execution of said group of instructions, said queue including a first portion in said first stage and a second portion in a second stage;
said first portion for initially storing said results of said processing;
results of said processing flowing from said first portion into said second portion regardless of whether said group of instructions is ready to checkpoint; and
in response to said queue receiving said hold signal, said second portion for holding said results in said second portion in said second stage until a determination is made that checkpointing can occur.

* * * * *